(12) United States Patent
Weydert et al.

(10) Patent No.: US 6,569,942 B2
(45) Date of Patent: May 27, 2003

(54) RUBBER COMPOSITIONS CONTAINING SILICON COUPLED OLIGOMERS

(75) Inventors: Marc Weydert, Luxembourg (LU); Wolfgang Lauer, Mersch (LU); Friedrich Visel, Bofferdange (LU); Rene Jean Zimmer, Howald (LU); Francois Kayser, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/082,575

(22) Filed: Feb. 25, 2002

(65) Prior Publication Data

US 2002/0132913 A1 Sep. 19, 2002

Related U.S. Application Data

(60) Provisional application No. 60/275,742, filed on Mar. 14, 2001.

(51) Int. Cl.$^7$ .............................................. C08L 23/16
(52) U.S. Cl. ...................... 525/105; 525/100; 525/104; 525/106
(58) Field of Search ................................ 525/100, 104, 525/105, 106

(56) References Cited

U.S. PATENT DOCUMENTS

| | | | |
|---|---|---|---|
| 3,624,014 A | * 11/1971 | Moore et al. | |
| 4,288,356 A | 9/1981 | Huebner et al. | ............ 260/29.6 |
| 4,545,914 A | 10/1985 | Graiver et al. | ............... 252/511 |
| 4,599,374 A | 7/1986 | Bluestein | .................... 523/213 |
| 4,618,650 A | * 10/1986 | Halasa et al. | ................ 525/106 |
| 4,977,200 A | 12/1990 | Itoh et al. | .................... 523/223 |
| 5,112,884 A | 5/1992 | Hanke | ......................... 523/116 |
| 5,182,174 A | 1/1993 | Stephenson | ................. 428/450 |
| 5,223,586 A | 6/1993 | Mautner et al. | ............. 525/477 |
| 5,409,609 A | 4/1995 | Soria et al. | .................. 210/321 |
| 5,631,331 A | 5/1997 | Sakakura et al. | ............ 525/478 |
| 5,840,800 A | 11/1998 | Joffre et al. | ................. 524/806 |
| 6,071,995 A | * 6/2000 | Labauze | ..................... 524/269 |

FOREIGN PATENT DOCUMENTS

| | | | |
|---|---|---|---|
| JP | 51013846 | 2/1976 | |
| JP | 61255945 | 11/1986 | ............ C08L/21/00 |
| JP | 8217842 | 8/1996 | ......... C08F/299/00 |
| JP | 10077368 | 3/1998 | ........... C08L/21/00 |
| JP | 11080373 | 3/1999 | .............. C08J/3/20 |
| JP | 11255843 | 9/1999 | ......... C08F/236/00 |

OTHER PUBLICATIONS

Abstract from Spanish Journal of article entitled "Effect of Surface Treatment of Silica on the Reinforcement of Elastomers" by Sanchez et al.; 1976.

Abstract of French Patent No. 2147395 dated Mar. 9, 1973.

* cited by examiner

*Primary Examiner*—Margaret G. Moore
(74) *Attorney, Agent, or Firm*—John D. DeLong

(57) ABSTRACT

There is disclosed a rubber composition comprising:
(A) 100 parts by weight of at least one rubber containing olefinic unsaturation; and
(B) 1.5 to 50 phr of a silicon coupled oligomer of the formula:

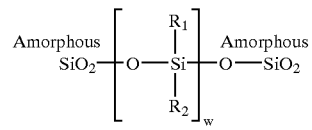

I where $R^1$ and $^2$ are individually selected from the group consisting of

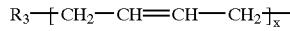

II

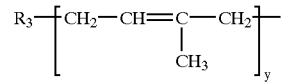

III

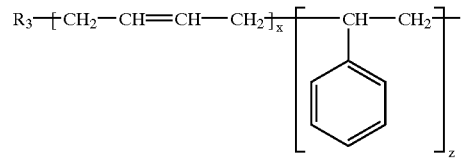

IV

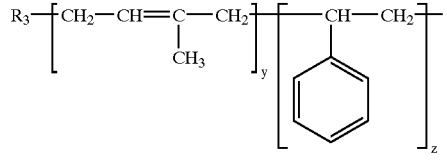

V

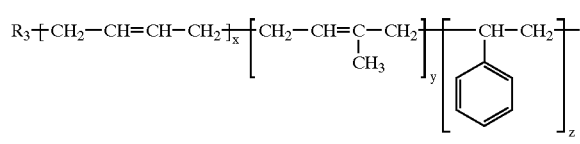

VI where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

13 Claims, No Drawings

RUBBER COMPOSITIONS CONTAINING SILICON COUPLED OLIGOMERS

The Applicants hereby incorporate by reference prior U.S. Provisional Application Ser. No. 60/275,742, filed on Mar. 14, 2001.

BACKGROUND OF THE INVENTION

JP 51013846 discloses $SiO_2$ that was radiation grafted with styrene had improved compatibility as a filler with rubber.

FR 2147395 discloses polymers grafted to $SiO_2$ by treating the solid with polymer in the presence of $AlCl_3$ or $BF_3$ in $O-Cl_2C_6H_4$ solution.

JP 11080373 discloses rubber being dissolved in organic solvents and mixed with organometallic compounds. The rubber was then subjected to sol-gel reaction so that oxides of the metal derived from the organometallic compound are formed and dispersed finely. Upon polymerization, chemical bonds are formed between the organometallic compounds and rubber.

SUMMARY OF THE INVENTION

The present invention relates to rubber compositions containing silicon coupled oligomers.

DETAILED DESCRIPTION OF THE INVENTION

There is disclosed a rubber composition comprising:

(A) 100 parts by weight of at least one rubber containing olefinic unsaturation; and (B) 1.5 to 50 phr of a silicon coupled oligomer of the formula:

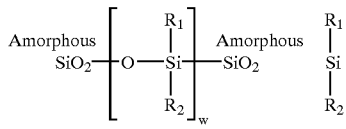

I where $R^1$ and $R^2$ are individually selected from the group consisting of

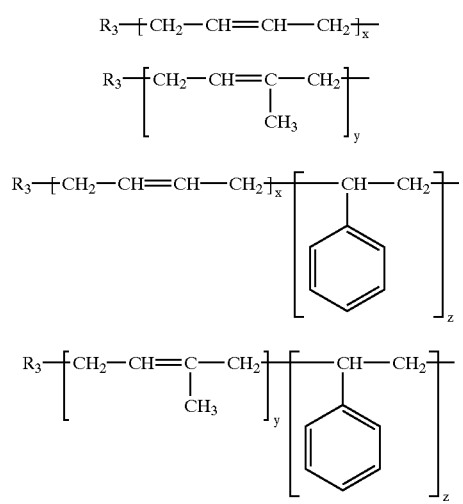

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

In addition, there is disclosed a pneumatic tire having a rubber component when the rubber in said component is comprised of (A) 100 parts by weight of at least one rubber containing olefinic unsaturation; and (B) 1.5 to 50 phr of a silicon coupled oligomer of the formula:

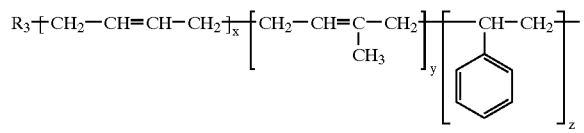

I where $R^1$ and $R^2$ are individually selected from the group consisting of

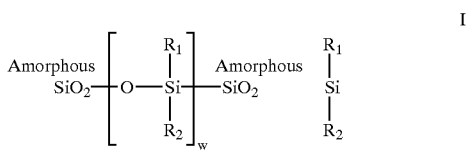

II

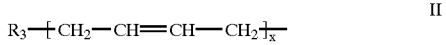

III

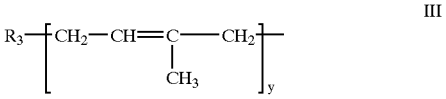

IV

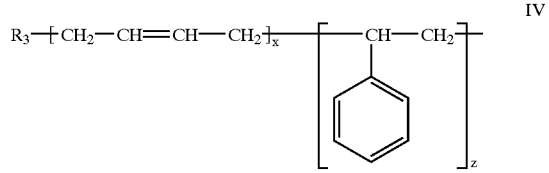

V

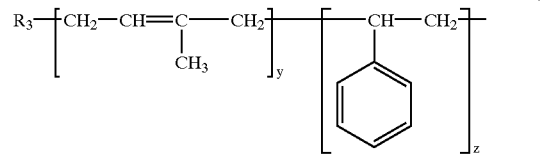

VI

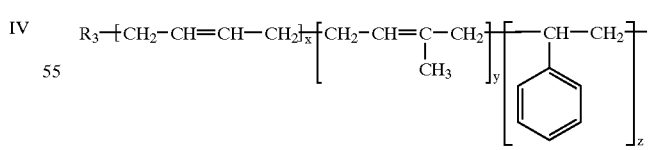

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

The present invention may be used with rubbers or elastomers containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include silicon-coupled and tin-coupled star-branched polymers. The preferred rubber or elastomers are polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The silica coupled oligomers are of the formula:

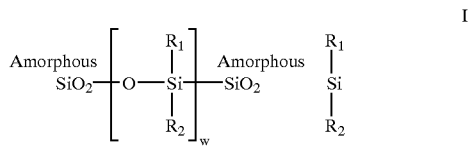

I where $R^1$ and $R^2$ are individually selected from the group consisting of

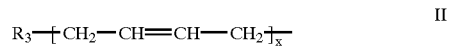

II

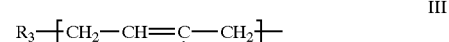

III

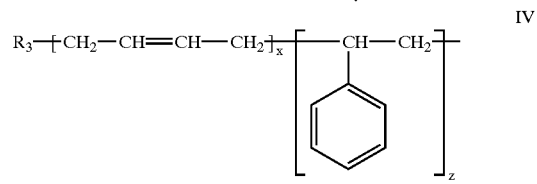

IV

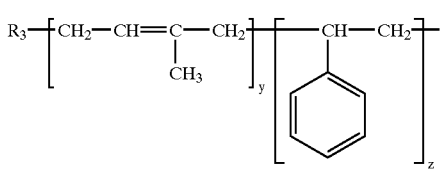

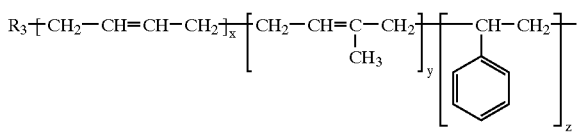

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100. Preferably, w is from 20 to 80, x is an integer of from 10 to 30, y is an integer of from 10 to 30 and z is an integer of from 10 to 30.

The materials of formula I are prepared by the reaction of tetraethoxyorganosilane (TEOS) with the composition of the formula

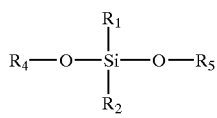

where $R_1$ and $R_2$ are as defined above and $R_4$ and $R_5$ are each an alkyl having from 1 to 4 carbon atoms.

The materials of formula VII are mixed with TEOS in an organic solvent and subjected to a sol gel condensation reaction.

Various acidic or basic condensation promoters may be used and, in general, are understood to be well known to those having skill in such art. For example, representative of basic promoters are, ammonia, ammonium hydroxide, N-butylamine, terbutylamine, tetrahydrofuran (THF), sodium fluoride, various proteins linear polyamines such as, for example, pentaethylene hexamine, diaminopropane, diethylenetriamine, triethylenetetramine and polyallylamines such as, for example, poly (allylaminehydrochloride), poly(L-lysine hydrobromide), poly(L-arginine hydrochloride) and poly (L-histidine hydrochloride). For example, representative of acidic promoters are phosphoric acid, acetic acid, hydrofluoric acid and sulfuric acid.

Metal salts and metal oxides can also be used as promoters or inhibitors of silane condensation reactions (i.e. Lewis acid or base reactions). Examples of metal salts are, for example, zinc sulfate, aluminate sulfate, zinc stearate and aluminum stearate. Examples of metal oxides are, for example, zinc oxide and aluminum oxide.

Typical catalysts for condensation reaction curing of silicon rubber might also be used. Examples are bis(2-ethylhexanoate) tin and bis(neodecanoate) tin.

The condensation reaction may be conducted in an extruder or other suitable reaction vessel.

The molar ratio of TEOS to the silane modified oligomer of formula VII should range from 10,000:1 to 10:1. Preferably, a molar ratio of from 1,000:1 to 50:1 is used.

The silane modified oligomer of formula VII may be obtained by reacting an active terminal of resulting living oligomer through oligomerization of 1,3-butadiene or oligomerization of 1,3-butadiene and styrene with an organic alkali metal initiator with a diethoxydichlorosilane. Of course in addition to the styrene and butadiene, other monomers, such as isoprene, can be used as can be seen from formulas II through VI above.

The oligomer used in the invention can be produced by the well known method using an organic alkali metal initiator. The production of such a polymer is usually carried out in an inert organic solvent. As the inert organic solvent, use may be made of pentane, hexane, cyclohexane, heptane, benzene, xylene, toluene, tetrahydrofuran, diethyl ether and the like.

At first, the oligomerization of 1,3-butadiene, oligomerization of 1,3-butadiene and styrene or other monomers is carried out in the presence of an organic alkali metal initiator. As the organic alkali metal initiator, examples include alkyllithiums such as n-butyllithium, sec-butyllithium, t-butyllithium, 1,4-dilithium butane, reaction product of butyllithium and divinylbenzene and the like; alkylene dilithium, phenyl lithium, stilbene dilithium, diisopropenylbenzene dilithium, sodium naphthalene, lithium naphthalene, etc.

In the case of the oligomerization, a Lewis base may be used as a randomizing agent and a regulating agent for microstructure of butadiene unit in the copolymer, if necessary. Examples of the Lewis base include ethers and tertiary amines such as dimethoxybenzene, tetrahydrofuran, dimethoxy ethane, diethylene glycol dibutyl ether, diethylene glycol dimethyl ether, triethylamine, pyridine, N-methyl morpholine, N,N,N',N'-tetramethyl ethylenediamine, 1,2-dipiperidinoethane and the like.

Moreover, the content of given bound monomer, such as styrene, in the copolymer can be controlled by varying the amount of the monomer in the monomer mixtures, while the introduction of monomer single chain in the copolymer, i.e., arrangement of styrene chain without sequence of styrene chain unit can be controlled by the use of an organic potassium compound such as potassium dodecylbenzene sulfonate or the like. In addition, the content of 1,2-bond in butadiene unit of the copolymer molecule can be controlled by varying the polymerization temperature.

Furthermore, the living oligomer may be produced by charging the monomers, i.e., 1,3-butadiene or 1,3-butadiene and styrene isoprene, the inert organic solvent, the organic alkali metal initiator and, if necessary, the Lewis base into a reaction vessel purged with nitrogen gas at once, discontinuously or continuously.

The oligomerization temperature is usually $-120°$ C. to $+150°$ C., preferably $-88°$ C. to $+120°$ C., and the oligomerization time is usually 5 minutes to 24 hours, preferably 10 minutes to 10 hours.

The oligomerization temperature may be held at a constant value within the above range or may be raised or be adiabatic. And, also, the oligomerization reaction may be carried out by batch system or continuous system.

Moreover, the concentration of the monomer in the solvent is usually 0.01 to 50 percent by weight, preferably 0.05 to 5 percent by weight.

The respective length of the oligomeric chain ($R_1$ nd $R_2$) is controlled by the initial amounts of monomer to initiator. For example, to achieve an oligomer were $R_1$ is II and "x" is 50, the weight ratio of initial monomer to initiator should be 50:1, taking into account experimental adjustments for the initiation/chain propagation ratio.

In the formation of the living oligomer, it is necessary to prevent the incorporation of a compound exhibiting a deactivation function such as halogen compound, oxygen, water, carbon dioxide gas or the like into the polymerization system as far as possible in order to avoid the deactivation of the organic alkali metal initiator and the resulting living oligomer.

The oligomer of formula VII is obtained by reacting the active terminal of the above living oligomer with diethoxydichlorosilane. The amount of the diethoxydichlorosilane used is not less than 0.5 molecule per one active terminal of the living oligomer. Preferably, the amount ranges from 0.5 to 1.0.

In the production of the oligomers of formula VII, the active terminal should be added to the diethoxydichlorosilane solution in order to have an excess chloro-functionality relative to the active terminal.

The reaction temperature is −120° C. to +150° C., preferably −80° C. to +120° C., and the reaction time is 1 minute to 5 hours, preferably 5 minutes to 2 hours.

After the completion of the reaction, the solvent may directly be removed from the oligomer solution under a reduced pressure to obtain a silane modified oligomer.

In the case of the oligomers containing formula IV, V and/or VII, the two or more units that make up each formula may be random or block in nature.

The amount of silicon coupled oligomers of formula I in the rubber may vary. For example, from 1.5 to 50 phr may be used. Preferably, from 8 to 45 phr is present in the rubber.

The rubber composition may additionally contain a conventional sulfur containing organosilicon compound. Examples of suitable sulfur containing organosilicon compounds are of the formula:

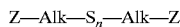

in which Z is selected from the group consisting of

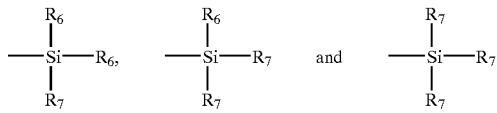

where $R_6$ is an alkyl group of 1 to 4 carbon atoms, cyclohexyl or phenyl; $R_7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis (triethoxysilylpropyl) tetrasulfide, 3,3'-bis (triethoxysilylpropyl) octasulfide, 3,3'-bis (trimethoxysilylpropyl) tetrasulfide, 2,2'-bis (triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricycloethoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis (dimethyl methoxysilylethyl) disulfide, 2,2'-bis(dimethyl sec butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl) tetrasulfide, 6,6'-bis (triethoxysilylhexyl) tetrasulfide, 12,12'-bis (triisopropoxysilyl dodecyl) disulfide, 18,18'-bis (trimethoxysilyloctadecyl) tetrasulfide, 18,18'-bis (tripropoxysilyloctadecenyl) tetrasulfide, 4,4'-bis (trimethoxysilyl-buten-2-yl) tetrasulfide, 4,4'-bis (trimethoxysilylcyclohexylene) tetrasulfide, 5,5'-bis (dimethoxymethylsilylpentyl) trisulfide, 3,3'-bis (trimethoxysilyl-2-methylpropyl) tetrasulfide, 3,3'-bis (dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis (triethoxysilylpropyl) disulfide and 3,3'-bis (triethoxysilylpropyl) tetrasulfide. Therefore as to formula VIII, preferably Z is

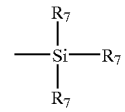

where $R_7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of Formula VIII in a rubber composition will vary depending on the level of other additives that are used. Generally speaking, the amount of the compound of formula VIII will range from 0.5 to 20 phr. Preferably, the amount will range from 1 to 10 phr.

In the rubber of the present invention, conventional fillers may be also present. The amount of such conventional fillers may range from 10 to 250 phr. Preferably, the filler is present in an amount ranging from 20 to 100 phr.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc.; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N539, N550, N582, N630, N642, N650, N683, N754, N762, N765, N774, N787, N908, N990 and N991. These carbon blacks have iodine absorptions ranging from 9 to 145 g/kg and DBP No. ranging from 34 to 150 cm$^3$/100 g.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the sulfur vulcanizable rubber composition is then sulfur-cured or vulcanized.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and silicon coupled oligomer are mixed in one or more non-productive mix stages. The terms "non-productive" and "productive" mix stages are well known to those having skill in the rubber mixing art. The silicon coupled oligomer may be added as a separate ingredient or in the form of a masterbatch. The rubber composition containing the silicon coupled oligomer as well as the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

One feature of the silicon coupled oligomers is their solubility in organic solvents. This feature offers the opportunity to incorporate such silicon coupled oligomers into the elastomers via a number of ways aside from mechanical working in a mixer or extruder. For example, it is contemplated that one can disperse or dissolve the silicon coupled oligomers in a polymer cement (elastomer solubilized in an organic solvent) with mixing and removal of the solvent to yield a uniformly dispersed silicon coupled oligomers in the elastomer. In accordance with another embodiment, one can solubilize the silicon coupled oligomers in the organic solvent along with the monomer or monomers for subsequent solution polymerization. Under this embodiment, the monomers polymerize to form the elastomer in the silicon coupled oligomers media.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Upon vulcanization of the sulfur vulcanized composition, the rubber composition of this invention can be used for various purposes. For example, the sulfur vulcanized rubber composition may be in the form of a tire, belt or hose. In case of a tire, it can be used for various tire components. Such tires can be built, shaped, molded and cured by various methods which are known and will be readily apparent to those having skill in such art. Preferably, the rubber composition is used in a sidewall and/or the tread of a tire. As can be appreciated, the tire may be a passenger tire, aircraft tire, truck tire and the like. Preferably, the tire is a passenger tire. The tire may also be a radial or bias, with a radial tire being preferred.

The rubber composition containing the silicon coupled oligomers of Formula I and rubber containing olefinic unsaturation may be incorporated in a variety of rubber components of the tire. For example, the rubber component may be a tread (including tread cap and tread base), sidewall, apex, chafer, sidewall insert, inner liner, wirecoat and ply coat. Preferably, the compound is the tread. Such tires can be built shaped molded and cured by various methods which are known and are readily apparent to those having skill in such art.

The pneumatic tire of the present invention may be a passenger tire, motorcycle tire, aircraft tire, agricultural, earthmover, off-the-road, truck tire and the like. Preferably, the tire is a passenger or truck tire. The tire may also be a radical or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

Upon vulcanization of the sulfur vulcanized composition, the rubber composition of this invention can be used for various purposes other than a tire. For example, the sulfur vulcanized rubber composition may be in the form of a belt or hose.

While certain representative embodiments and details have been shown for the purpose of illustrating the invention, it will be apparent to those skilled in this art that various changes and modifications may be made therein without departing from the spirit or scope of the invention.

What is claimed is:

1. A method of processing a rubber composition comprising mixing (A) 100 parts by weight of at least one rubber containing olefinic unsaturation; and (B) 1.5 to 50 phr of a silicon coupled oligomer of the formula:

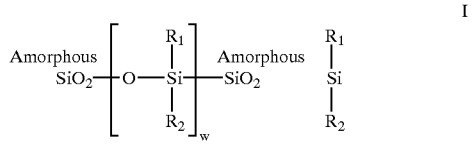

where $R^1$ and $R^2$ are individually selected from the group consisting of

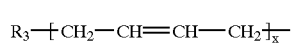

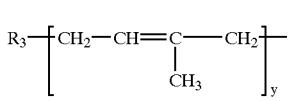

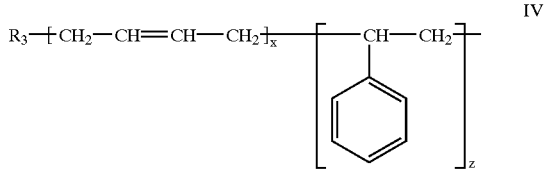

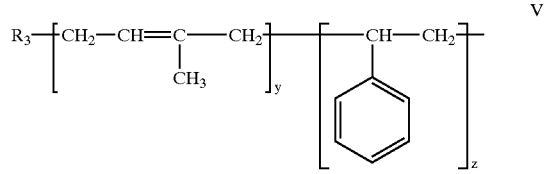

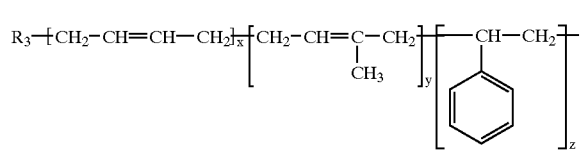

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

2. The method of claim 1 wherein said rubber containing olefinic unsaturation is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

3. The method of claim 1 wherein the silicon coupled oligomers and rubber containing olefinic unsaturation are mixed in the presence of an organic solvent.

4. The method of claim 1 wherein said rubber composition is thermomechanically mixed at a rubber temperature in a range of from 140° C. to 190° C. for a mixing time of from 1 to 20 minutes.

5. A rubber composition comprising (A) 100 parts by weight of at least one rubber containing olefinic unsaturation; and (B) 1.5 to 50 phr of a silicon coupled oligomer of the formula:

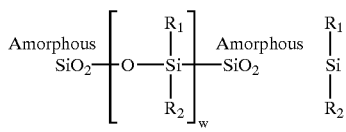

where $R^1$ and $R^2$ are individually selected from the group consisting of

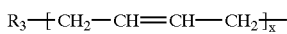

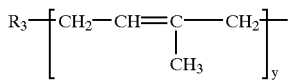

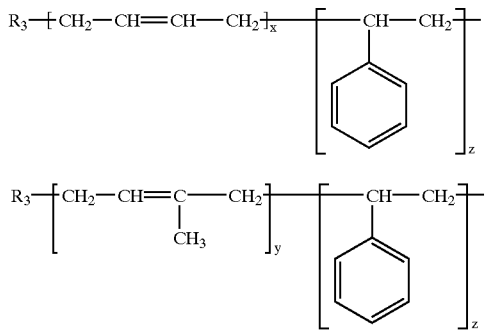

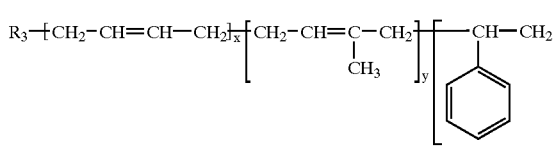

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

6. The composition of claim 5 wherein said rubber is selected from the group consisting of natural rubber, neoprene, polyisoprene, butyl rubber, halobutyl rubber, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM, silicon-coupled star-branched polymers, tin-coupled star-branched polymers and mixtures thereof.

7. The composition of claim 5 wherein said composition is thermomechanically mixed at a rubber temperature in a range of from 140° C. to 190° C. for a total mixing time of from 1 to 20 minutes.

8. A sulfur vulcanized rubber composition which is prepared by heating the composition of claim 5 to a temperature ranging from 100° C. to 200° C. in the presence of a sulfur vulcanizing agent.

9. The rubber composition of claim 8 in the form of a tire, belt or hose.

10. A pneumatic tire having a rubber component where the rubber composition in said component is comprised of
   (A) 100 parts by weight of at least one rubber containing olefinic unsaturation; and
   (B) 1.5 to 50 phr of a silicon coupled oligomer of the formula:

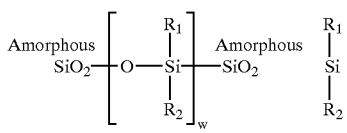

where $R^1$ and $R^2$ are individually selected from the group consisting of

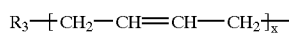

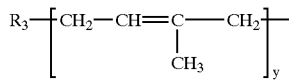

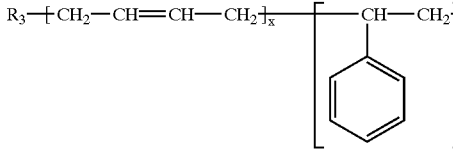

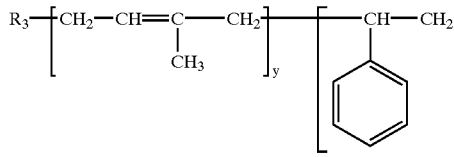

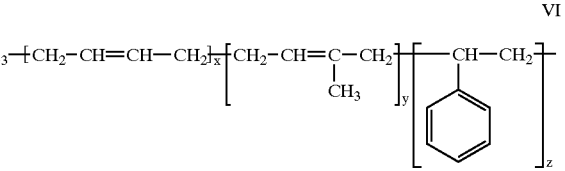

where $R_3$ is selected from the group consisting of alkyls having 1 or 4 carbon atoms; w is an integer of from 9 to 149, x is an integer of from 1 to 100, y is an integer of from 1 to 100, and z is an integer of from 1 to 100 with the proviso that the sum total of x, y and z in each $R_1$ and $R_2$ ranges from 3 to 100.

11. The pneumatic tire of claim 10 wherein said tire is selected from the group consisting of passenger tires, motorcycle tires, aircraft tires, agricultural, earthmover, off-the-road and truck tires.

12. The pneumatic tire of claim 10 where said tire is a radial.

13. A pneumatic tire of claim 10 wherein said rubber component is selected form the group consisting of a tread cap, tread base, sidewall, innerliner, apex, chafer, sidewall insert, wirecoat and ply coat.

* * * * *